(12) United States Patent
Ito et al.

(10) Patent No.: US 9,059,765 B2
(45) Date of Patent: Jun. 16, 2015

(54) RECEPTION DEVICE AND RECEPTION METHOD

(71) Applicants: Naosuke Ito, Tokyo (JP); Jun Ido, Tokyo (JP)

(72) Inventors: Naosuke Ito, Tokyo (JP); Jun Ido, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/370,200

(22) PCT Filed: Nov. 14, 2012

(86) PCT No.: PCT/JP2012/079494
§ 371 (c)(1),
(2) Date: Jul. 1, 2014

(87) PCT Pub. No.: WO2013/128724
PCT Pub. Date: Sep. 6, 2013

(65) Prior Publication Data
US 2014/0341324 A1    Nov. 20, 2014

(30) Foreign Application Priority Data
Mar. 1, 2012   (JP) .................................. 2012-045177

(51) Int. Cl.
H04B 7/08    (2006.01)
H04L 25/02   (2006.01)

(52) U.S. Cl.
CPC .......... *H04B 7/0885* (2013.01); *H04L 25/0206* (2013.01); *H04L 25/0212* (2013.01); *H04L 25/0204* (2013.01); *H04L 25/0224* (2013.01); *H04B 7/0854* (2013.01)

(58) Field of Classification Search
CPC ............... H04B 7/12; H04B 7/02; H04B 7/08
See application file for complete search history.

(56) References Cited

U.S. PATENT DOCUMENTS

| | | | |
|---|---|---|---|
| 6,512,738 B1 * | 1/2003 | Namekata et al. ............ | 370/210 |
| 6,700,865 B1 * | 3/2004 | Yamamoto et al. ........... | 370/208 |
| 6,833,810 B2 * | 12/2004 | Bortnyk et al. ............... | 342/189 |

(Continued)

FOREIGN PATENT DOCUMENTS

| | | |
|---|---|---|
| JP | 4-268831 A | 9/1992 |
| JP | 8-242196 A | 9/1996 |
| JP | 11-205208 A | 7/1999 |
| JP | 2001-156738 A | 6/2001 |
| JP | 2002-368714 A | 12/2002 |
| JP | 3377361 B2 | 2/2003 |
| JP | 2004-135120 A | 4/2004 |
| JP | 2005-295506 A | 10/2005 |
| JP | 3724501 B1 | 12/2005 |
| JP | 2006-54675 A | 2/2006 |
| JP | 2010-68263 A | 3/2010 |
| JP | 2010-118768 A | 5/2010 |
| JP | 2010-136347 A | 6/2010 |
| JP | 2010-272978 A | 12/2010 |
| JP | 2012-70341 A | 4/2012 |
| WO | WO 2010/016232 A1 | 2/2010 |
| WO | WO 2012/086425 A1 | 6/2012 |
| WO | WO 2013/008347 A1 | 1/2013 |
| WO | WO 2013/054550 A1 | 4/2013 |

*Primary Examiner* — Jaison Joseph

(74) *Attorney, Agent, or Firm* — Birch, Stewart, Kolasch & Birch, LLP

(57) ABSTRACT

A reception device includes signal receiving units that generate received signals from signals obtained by receiving a transmitted signal at antennas, signal processing units that perform processes of generating received frequency domain signals by transforming the received signals to signals in the frequency domain, calculating channel impulse responses of the received signals, calculating estimated received signals from the channel impulse responses, and calculating residual error weights with values that decrease with increasing differences between the received signals and the estimated received signals, a combining ratio calculation unit that calculates combining ratios for the received frequency domain signals such that the ratios decrease as the residual error weights decrease, a diversity combining unit that combines the received frequency domain signals according to the combining ratios to generate a diversity combined signal, and an inverse Fourier transform unit that transforms the diversity combined signal to a time domain signal.

16 Claims, 7 Drawing Sheets

(56) References Cited

U.S. PATENT DOCUMENTS

| | | | |
|---|---|---|---|
| 6,922,453 B2 * | 7/2005 | Miyanaga et al. | 375/347 |
| 6,940,932 B2 * | 9/2005 | Henriksson | 375/347 |
| 7,221,722 B2 * | 5/2007 | Thomas et al. | 375/346 |
| 7,310,503 B2 * | 12/2007 | Ido | 455/140 |
| 7,652,527 B2 | 1/2010 | Ido et al. | |
| 8,626,077 B2 * | 1/2014 | Nishio | 455/67.11 |
| 2002/0196734 A1 * | 12/2002 | Tanaka et al. | 370/210 |
| 2004/0229581 A1 * | 11/2004 | Mizoguchi et al. | 455/136 |
| 2007/0223628 A1 | 9/2007 | Kim et al. | |
| 2011/0002427 A1 * | 1/2011 | Hamamoto | 375/347 |
| 2011/0286412 A1 * | 11/2011 | Mochida et al. | 370/329 |
| 2013/0177064 A1 | 7/2013 | Ido et al. | |
| 2013/0294548 A1 * | 11/2013 | Kim et al. | 375/340 |
| 2014/0036983 A1 | 2/2014 | Ito et al. | |

* cited by examiner

RECEPTION DEVICE AND RECEPTION METHOD

TECHNICAL FIELD

The present invention relates to a reception device and a reception method.

BACKGROUND ART

To compensate for channel distortion and fading when demodulating received signals, reception devices require improved demodulation accuracy and assured tracking of rapid channel changes. Techniques for this purpose include equalization, which corrects the phase and amplitude of the received signal, and diversity, which improves reception performance by combining signals from multiple antennas.

A known method of equalization is to estimate the channel by using a known signal added onto the received signal as a reference signal and use the channel estimate signal to correct the received signal. Another known method of equalization (patent references 1 and 2 for example) first equalizes a data interval other than the known signal, estimates the channel by using the re-encoded signal as a reference signal, and then corrects the received signal. These methods can compensate for channel distortion.

A known diversity technique (patent references 2 and 3 for example) is the maximum ratio combining technique that aligns the phases of the signals (also referred to below as branches) received at the different antennas, weights the signals according to their received signal levels, and then combines them, thereby maximizing the carrier power to noise power ratio (also referred to below as the 'C/N'). Another proposed diversity technique (patent reference 4 for example) detects an equivalent C/N, input power, and delay profile from the demodulated signal of each branch and controls their combining ratios according to these factors in order to improve reception performance.

PRIOR ART REFERENCES

Patent References

Patent reference 1: Japanese Patent Application Publication No. 2010-118768 (p. 11, FIG. 2)
Patent reference 2: U.S. Patent Application Publication No. 2007/0223628 (p. 3, FIG. 2)
Patent reference 3: Japanese Patent No. 3377361 (p. 8, FIG. 1, FIG. 2)
Patent reference 4: Japanese Patent No. 3724501 (p. 37, FIG. 1)

SUMMARY OF THE INVENTION

Problems to be Solved by the Invention

When a received signal is equalized by use of a channel estimation result, if the estimation error (also referred to below as 'channel estimation error') occurring in the channel estimate is large, reception performance is degraded. This occurs, for example, when the channel cannot be estimated frequently enough to cope with channel changes, when there are large temporal changes in channel characteristics and adequate processing time cannot be given to channel estimation, when the specifications and performance of the channel estimation circuitry and channel estimation method are inadequate for the channel delay profile, or when the channel characteristics change within the interval occupied by the reference signal used for channel estimation.

It is generally known that when diversity is used, the diversity gain is maximized by determining the combining ratios according to an envelope ratio of each of the signals (also referred to below as 'branches') received from the antennas. Calculating the combining ratios on the basis of the envelope ratios maximizes the diversity gain when, however, the respective branches have identical C/Ns. Accordingly, when combining ratios are calculated on the basis of envelope ratios for signals with different C/Ns, not only is the error rate of the decoding result insufficiently reduced; the error rate may even increase. Patent reference 4 addresses this problem by detecting the C/N on the basis of an equalized signal and then using the result (also referred to below as the 'detected C/N') in the calculation of the combining ratios, thereby reducing performance degradation. When the channel estimation errors differ from branch to branch, however, this causes the problem of reducing the effect of diversity combination. This indicates that there are cases in which, because the detected C/N described above is calculated on the basis of the equalized signal, the effect of channel estimation error cannot be separated from the effect of noise, and the combination ratio cannot be optimized.

When, for example, a delayed wave with a delay time exceeding the detectable range is received in a channel estimation means for a first branch, the channel characteristics cannot be estimated, the channel estimation error becomes large, and the detected C/N deteriorates. Alternatively, even if the first and second branches have identical detected C/N values, when the contributing factor in the second branch is noise rather than a delayed wave, because its C/N is improved and its errors are reduced by diversity and error correction means in the following stages, the second branch has higher reliability. Conventional diversity combination based on the detected C/N results, however, makes the combining ratio 1:1, failing to use the second branch effectively and degrading the combining accuracy.

The present invention addresses the above problem with the object of mitigating deterioration of combining accuracy when the accuracy of channel estimation signals and equalized signals deteriorates due to channel changes.

Means for Solving the Problem

A reception device according to an embodiment of the invention includes a plurality of signal receiving units for generating a plurality of received signals from a plurality of signals obtained by receiving a transmitted signal at a plurality of antennas, a plurality of signal processing units for performing processes of generating received frequency domain signals by transforming the received signals to signals in the frequency domain, calculating channel impulse responses of the received signals, calculating estimated received signals from the channel impulse responses, and calculating residual error weights with values that decrease with increasing differences between the received signals and the estimated received signals, a combining ratio calculation unit for calculating combining ratios for the received frequency domain signals such that the ratios decrease as the residual error weights decrease, a diversity combining unit for combining the received frequency domain signals according to the combining ratios to generate a diversity combined signal, and an inverse transform unit for transforming the diversity combined signal to a time domain signal.

Effect of the Invention

According to one aspect of the invention, deterioration of combining accuracy can be mitigated when the accuracy of channel estimation signals and equalized signals deteriorates due to channel changes.

MODE FOR CARRYING OUT THE INVENTION

First Embodiment

Figure 1:
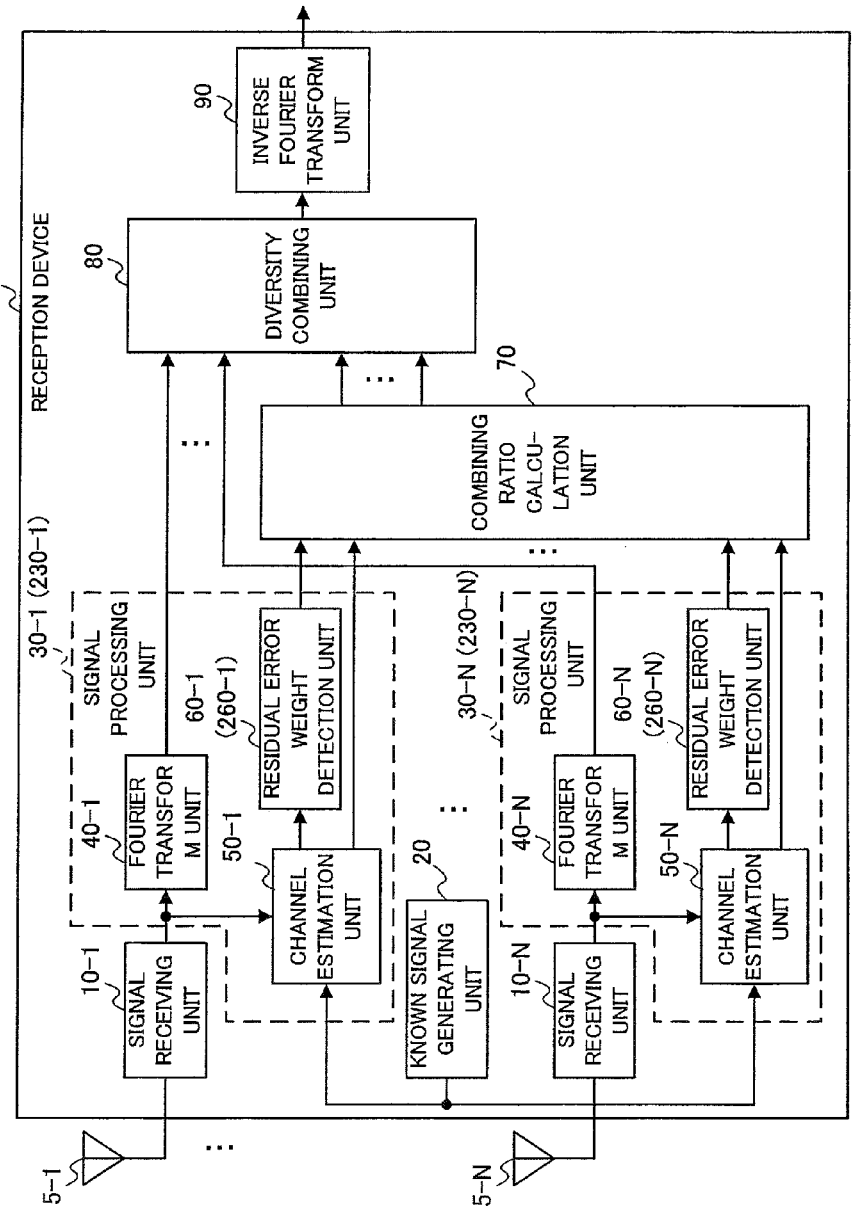
FIG. 1 is a block diagram schematically showing the structure of a reception device according to first and second embodiments.

FIG. 1 is a block diagram schematically showing the structure of a reception device 1 according to the first embodiment. FIG. 1 shows a case in which a signal is received by use of N antennas 5-1, . . . , 5-N (referred to as antennas 5 when there is no particular need to distinguish among them individually; N is an integer equal to or greater than two) and the signal is decoded after diversity combination. The reception device 1 includes signal receiving units 10-1, . . . , 10-N (referred to as signal receiving units 10 when there is no particular need to distinguish among them individually), a known signal generating unit 20, signal processing units 30-1, . . . , 30-N (referred to as signal processing units 30 when there is no particular need to distinguish among them individually), a combining ratio calculation unit 70, a diversity combining unit 80, and an inverse Fourier transform unit 90. The reception device 1 includes the same numbers of signal receiving units 10 and signal processing units 30 as the number of antennas 5; the signal receiving units 10 all operate identically, and the signal processing units 30 all operate identically. Elements in the second embodiment are indicated by reference characters in parentheses in FIG. 1.

Each signal receiving unit 10 generates a received signal by converting a broadcast signal obtained by receiving a transmitted signal at an antenna 5 to a predetermined frequency band. The signal receiving unit 10 includes, for example, a tuner (not shown), and a synchronous processor (not shown) that generates a baseband signal (received signal) by performing synchronous detection on a signal from the tuner. The broadcast signal may be modulated by, for example, multi-level VSB, QPSK, or multivalued QAM. Alternatively, the modulation method may be AM modulation. The signal receiving units 10 supply the received signals they generate to the signal processing units 30.

The known signal generating unit 20 generates a known signal that is added onto the transmitted signal. In the terrestrial digital broadcasting system in the U.S., for example, a pseudorandom signal is embedded in the transmitted data sequence at regular intervals. Because this pseudorandom signal is a known signal, it can be generated on the receiving side.

Each signal processing unit 30 generates a received frequency domain signal by transforming the received signal supplied from the signal receiving unit 10 to a signal in the frequency domain. The signal processing unit 30 also calculates an estimated value of the channel of the received signal by estimating the channel characteristic of the received signal. In addition, the signal processing unit 30 calculates a residual error weight with a value that decreases with increasing error between the channel characteristic of the received signal and the estimated value of the channel characteristic of the received signal.

The signal processing units 30-1, . . . , 30-N include Fourier transform units 40-1, . . . , 40-N (referred to as Fourier transform units 40 when there is no particular need to distinguish among them individually), channel estimation units 50-1, . . . , 50-N (referred to as channel estimation units 50 when there is no particular need to distinguish among them individually), and residual error weight detection units 60-1, . . . , 60-N (referred to as residual error weight detection units 60 when there is no particular need to distinguish among them individually). The reception device 1 includes the same numbers of Fourier transform units 40, channel estimation units 50, and residual error weight detection units 60 as the number of antennas 5, all operating identically.

By performing a Fourier transform with a predetermined number of points on the received signal supplied from the signal receiving unit 10, each Fourier transform unit 40 generates a received frequency domain signal in which the received signal is transformed to a signal in the frequency domain. The Fourier transform unit 40 supplies the received frequency domain signal it generates to the diversity combining unit 80.

Each channel estimation unit 50 calculates an estimated value of the channel characteristic of the received signal by estimating the channel characteristic of the received signal supplied from the signal receiving unit 10 on the basis of the known signal supplied from the known signal generating unit 20. The estimated value of the channel characteristic of the received signal is the impulse response of the channel. The channel estimation unit 50 generates a channel characteristic signal indicating the calculated estimated value, and generates a frequency domain channel signal by transforming the generated channel characteristic signal to a signal in the frequency domain. The channel estimation unit 50 supplies the generated frequency domain channel signal to the combining ratio calculation unit 70.

The channel estimation unit 50 also generates an error signal indicating the difference between the received signal supplied from the signal receiving unit 10 and the estimated received signal obtained in the process of estimating the channel characteristic. The difference between the received signal and the estimated received signal indicates an error between the channel characteristic of the received signal and the estimated value of the channel characteristic of the received signal. The channel estimation unit 50 supplies the generated error signal to the residual error weight detection unit 60.

Each residual error weight detection unit 60 calculates a residual error weight indicating the magnitude of the channel estimation error on the basis of the error signal supplied from the channel estimation unit 50. As the value of the residual error weight decreases, it represents increasingly low reliability of the channel estimation result, in other words, increasing channel estimation error. The residual error weight detection unit 60 generates a residual error weight signal indicating the calculated residual error weight, and supplies the generated residual error weight signal to the combining ratio calculation unit 70.

Figure 2:
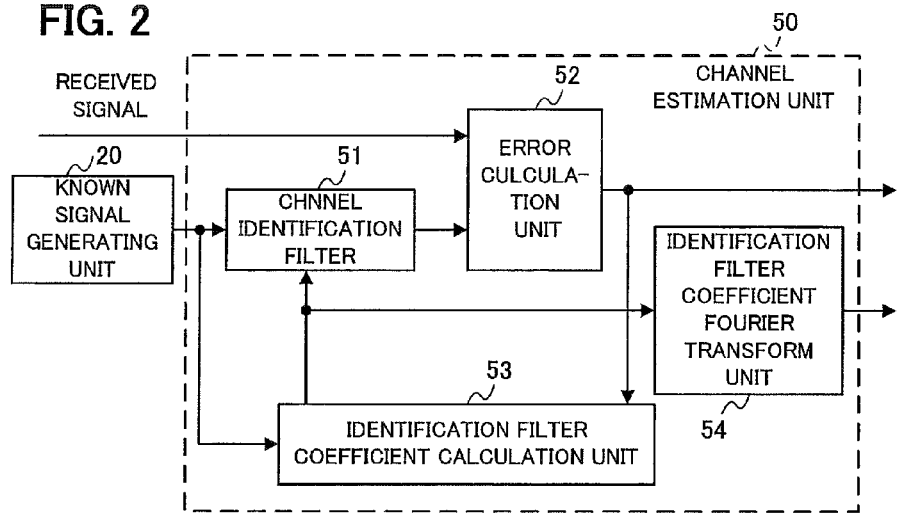
FIG. 2 is a block diagram schematically showing the structure of a channel estimation unit in the first embodiment.

FIG. 2 is a block diagram schematically showing the structure of the channel estimation unit 50. The channel estimation unit 50 includes a channel identification filter 51, an error calculation unit 52, an identification filter coefficient calculation unit 53, and an identification filter coefficient Fourier transform unit 54 that functions as an identification filter coefficient transform unit.

The channel identification filter 51 generates an estimated received signal by filtering the known signal supplied from the known signal generating unit 20 according to filter coefficients supplied from the identification filter coefficient calculation unit 53. The channel identification filter 51 supplies the estimated received signal it generates to the error calculation unit 52.

The error calculation unit 52 calculates the difference between the estimated received signal supplied from the channel identification filter 51 and the received signal supplied from the signal receiving unit 10. The error calculation unit 52 generates an error signal indicating the calculated difference, and supplies the generated error signal to the identification filter coefficient calculation unit 53 and the residual error weight detection unit 60.

The identification filter coefficient calculation unit 53 calculates the filter coefficients used in the channel identification filter 51 in such a way that the difference indicated by the error signal supplied from the error calculation unit 52 is eliminated, in other words, the estimated received signal generated by the channel identification filter 51 matches the received signal supplied from the signal receiving unit 10. In other words, when the estimated received signal matches the received signal, the part including the channel identification filter 51 and identification filter coefficient calculation unit 53 represents the channel through which the received signal has passed, and the output from the identification filter coefficient calculation unit 53 represents the impulse response of the channel. The identification filter coefficient calculation unit 53 generates a channel characteristic signal indicating the calculated filter coefficients, and supplies the generated channel characteristic signal to the channel identification filter 51 and the identification filter coefficient Fourier transform unit 54.

The identification filter coefficient calculation unit 53 generally uses an iterative update algorithm such as the LMS (Least Mean Square Error) algorithm or CMA (Constant Modulus Algorithm), updates the filter coefficients iteratively, and generates new filter coefficients so as to reduce the difference indicated by the error signal supplied from the error calculation unit 52 to zero. FIG. 2 shows an exemplary structure when LMS is used. Such algorithms are prior art, and because any conventional algorithm and means may be used to obtain the impulse response of the channel in the identification filter coefficient calculation unit 53 in the present invention, a detailed description will be omitted.

By performing a Fourier transform with a predetermined number of points on the channel characteristic signal supplied from the identification filter coefficient calculation unit 53, the identification filter coefficient Fourier transform unit 54 generates a frequency domain channel signal in which the supplied channel characteristic signal is transformed to a signal in the frequency domain. The identification filter coefficient Fourier transform unit 54 supplies the generated frequency domain channel signal to the combining ratio calculation unit 70.

When the algorithm used in the identification filter coefficient calculation unit 53 is CMA, the error calculation unit 52 may generate the error signal described above; alternatively, the error calculation unit 52 may calculate the difference between the squared value of the output from the identification filter coefficient calculation unit 53, which is computed in CMA, and a predetermined constant, and generate an error signal indicating the calculated difference.

Figure 3:
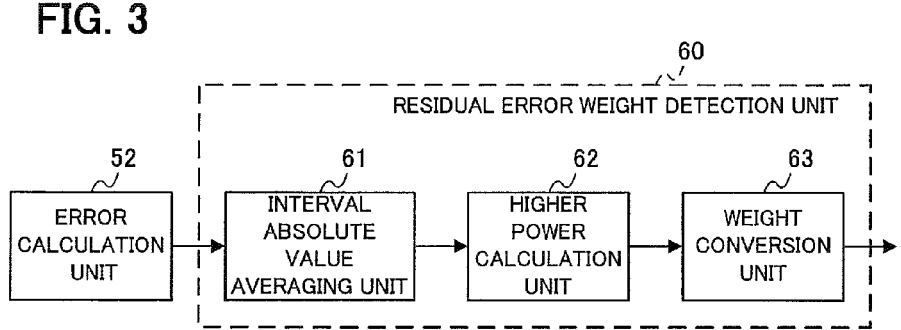
FIG. 3 is a block diagram schematically showing the structure of a residual error weight detection unit in the first embodiment.

FIG. 3 is a block diagram schematically showing the structure of the residual error weight detection unit 60. The residual error weight detection unit 60 includes an interval absolute value averaging unit 61, a higher power calculation unit 62, and a weight conversion unit 63.

The interval absolute value averaging unit 61 calculates an interval average value by averaging the absolute values of the error signals supplied from the error calculation unit 52 over a prescribed interval. The interval absolute value averaging unit 61 also generates an interval average value signal indicating the calculated interval average value, and supplies the generated interval average value signal to the higher power calculation unit 62.

The higher power calculation unit 62 generates a value raised to a higher power by taking the mth power of the interval average value indicated by the interval average value signal supplied from the interval absolute value averaging unit 61. Here, m is a natural number equal to or greater than two. The higher power calculation unit 62 generates a higher power value signal indicating the calculated value raised to the higher power, and supplies the generated higher power value signal to the weight conversion unit 63. The rate of increase of the higher power value signal increases as the interval average value increases.

The weight conversion unit 63 calculates the residual error weight from the value raised to a higher power indicated by the higher power value signal supplied from the higher power calculation unit 62. The residual error weight indicates the level of reliability of the channel estimation result of the branch; it has a non-negative value, and decreases as the interval average value increases, that is, as the average absolute value of the error signal increases. The following exemplary expression (1) shows the value raised to a higher power (G) indicated by the higher power value signal supplied from the higher power calculation unit 62, and the residual error weight (J) generated by the weight conversion unit 63. The letter A denotes a positive real number.

[Mathematical expression 1]

$$\left. \begin{array}{l} J = 1 - AG, \ G < 1/A \\ J = 0, \text{ other than the above} \end{array} \right\} \quad (1)$$

In expression (1) above, the residual error weight (J) has a non-negative value, and decreases as the value raised to a higher power (G) increases. Because the rate of increase of the value raised to a higher power (G) increases as the interval average value increases, the rate of decrease of the residual error weight (J) increases as the interval average value increases. The residual error weight (J) satisfies $0 \le J \le 1$.

Figure 4:
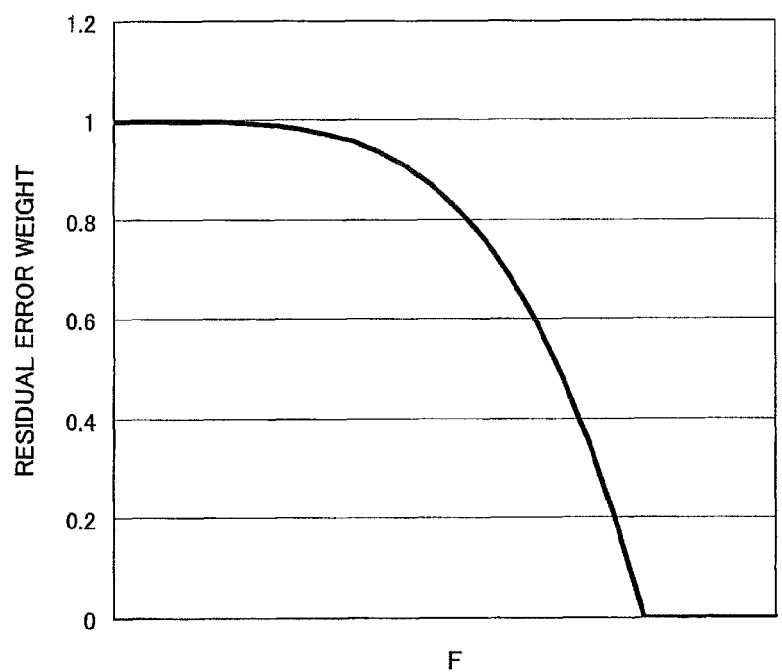
FIG. 4 is a schematic diagram showing a graph of a function with a horizontal axis indicating interval average value and a vertical axis indicating residual error weight in the first embodiment.

A graph with a horizontal axis indicating the interval average value (F) supplied from the error calculation unit 52 and a vertical axis indicating the residual error weight, illustrating the function obtained when the weight conversion unit 63 calculates the residual error weight by use of expression (1), is shown in FIG. 4. In FIG. 4, m=4.

The weight conversion unit 63 generates a residual error weight signal indicating the calculated residual error weight, and supplies this residual error weight signal to the combining ratio calculation unit 70.

The frequency domain channel signal and the residual error weight signal generated for each antenna system are supplied to the combining ratio calculation unit 70. The combining ratio calculation unit 70 calculates the combining ratios of the received frequency domain signals in such a way that the ratio decreases as the residual error weight indicated by the residual error weight signal decreases.

Figure 5:
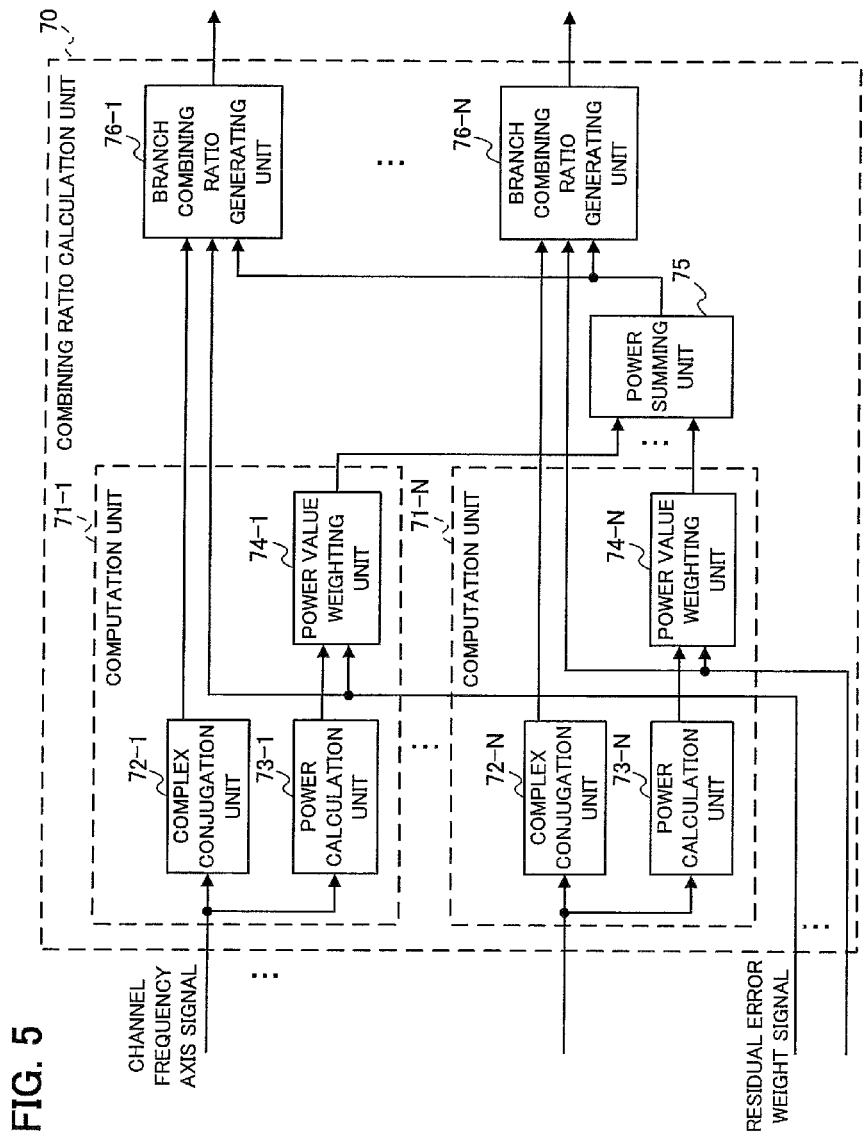
FIG. 5 is a block diagram schematically showing the structure of the combining ratio calculation unit in the first embodiment.

FIG. 5 is a block diagram schematically showing the structure of the combining ratio calculation unit 70. The combining ratio calculation unit 70 includes computation units 71-1, ..., 71-N (referred to as computation units 71 when there is no particular need to distinguish among them individually), a power summing unit 75, and branch combining ratio generating units 76-1, ..., 76-N (referred to as branch combining ratio generating units 76 when there is no particular need to distinguish among them individually). The reception device 1 includes the same numbers of computation units 71 and branch combining ratio generating units 76 as the number of antennas 5, all operating identically.

Each computation unit 71 generates a complex conjugate signal of the frequency domain channel signal supplied from the corresponding signal processing unit 30. The computation unit 71 supplies the generated complex conjugate signal to the corresponding branch combining ratio generating unit 76. The computation unit 71 also identifies a power value from the frequency domain channel signal supplied from the corresponding signal processing unit 30, and generates a weighted power value by weighting the identified power value with the residual error weight indicated by the residual error weight signal supplied from the corresponding signal processing unit 30. The computation unit 71 supplies the weighted power value to the power summing unit 75.

The computation units 71-1, ..., 71-N include complex conjugation units 72-1, ..., 72-N (referred to as complex conjugation units 72 when there is no particular need to distinguish among them individually), power calculation units 73-1, ..., 73-N (referred to as power calculation units 73 when there is no particular need to distinguish among them individually), and power value weighting units 74-1, ..., 74-N (referred to as power calculation units 73 when there is no particular need to distinguish among them individually). The reception device 1 includes the same numbers of complex conjugation units 72, power calculation units 73, and power value weighting units 74 as the number of antennas 5, all operating identically.

Each complex conjugation unit 72 calculates a complex conjugate signal of the frequency domain channel signal supplied from the corresponding signal processing unit 30. The complex conjugation unit 72 supplies the calculated complex conjugate signal to the corresponding branch combining ratio generating unit 76.

Each power calculation unit 73 calculates the square of the amplitude of the frequency domain channel signal supplied from the corresponding signal processing unit 30. The power calculation unit 73 generates a power signal indicating the calculated squared value, and supplies the generated power signal to the power value weighting unit 74.

The power value weighting unit 74 calculates a weighted power value by weighting the squared value indicated by the power signal supplied from the power calculation unit 73 with the residual error weight indicated by the residual error weight signal supplied from the corresponding signal processing unit 30. The power value weighting unit 74 calculates a weighted power value by, for example, multiplying the squared value by the residual error weight. The power value weighting unit 74 generates a weighted power value signal indicating the weighted power value thus calculated, and supplies the generated weighted power value signal to the power summing unit 75.

The power summing unit 75 calculates a power sum by adding the weighted power values indicated by the weighted power value signals obtained from the plurality of power value weighting units 74-1, ..., 74-N. The power summing unit 75 generates a power sum signal indicating the calculated power sum, and supplies the generated power sum signal to the branch combining ratio generating unit 76.

The branch combining ratio generating unit 76 calculates a diversity combining ratio for each antenna system on the basis of the complex conjugate signal supplied from the corresponding computation unit 71, the residual error weight signal supplied from the corresponding signal processing unit 30, and the power sum signal supplied from the power summing unit 75. The branch combining ratio generating unit 76 calculates the combining ratio by use of, for example, the following equation (2). In equation (2), $W_n$ is the combining ratio of the received frequency domain signal output from signal processing unit 30-$n$ ($n$ is a natural number satisfying $1 \leq n \leq N$). $H_n$ is the complex conjugate signal supplied from the computation unit 71-$n$, and $P_n$ is the squared value calculated by the power calculation unit 73-$n$. In addition, $J_n$ is the residual error weight indicated by the residual error weight signal supplied from signal processing unit 30-$n$.

[Mathematical expression 2]

$$W_n = \frac{J_n H_n}{\sum_{k=1}^{N} J_k P_k} \quad (2)$$

The combining ratio calculation unit 70 is not limited to the method described above; it only needs to operate in such a way that the combining ratio increases as the residual error weight increases, in other words, as the received frequency domain signal has increasingly higher reliability. The branch combining ratio generating unit 76 generates a combining ratio signal indicating the calculated combining ratio, and supplies the generated combining ratio signal to the diversity combining unit 80.

As shown in the following equation (3), the diversity combining unit 80 weights the received frequency domain signals supplied from the corresponding signal processing units 30 on the basis of the combining ratios indicated by the combining ratio signals supplied from the combining ratio calculation unit 70, and adds the respective weighted received frequency domain signals. In equation (3), $X_n$ is the received frequency domain signal supplied from signal processing unit 30-$n$. Y is the diversity combined signal. The diversity combining unit 80 supplies the calculated diversity combined signal to the inverse Fourier transform unit 90.

[Mathematical expression 3]

$$Y = \sum_{n=1}^{N} W_n X_n \quad (3)$$

The inverse Fourier transform unit 90 transforms the diversity combined signal to a signal in the time domain by performing an inverse Fourier transform on the diversity combined signal supplied from the diversity combining unit 80. The inverse Fourier transform unit 90 outputs the signal transformed to the time domain as a demodulated signal in which distortion of the received signal produced in the channel has been corrected and diversity combination has been performed.

As described above, according to the first embodiment, because signals proportional to the channel estimation error are generated on the basis of the unequalized signals, and this information is used when diversity combination is performed on the signals received at the antennas 5, the diversity gain when the channels cannot be estimated frequently enough to cope with channel changes, when there are large temporal changes in channel characteristics and adequate processing time cannot be given to channel estimation, or when the channel characteristics change within the interval occupied by the reference signal used for channel estimation can be improved, and the errors in the transmitted signal recovered at the receiving end can be reduced.

Second Embodiment

The residual error weights generated by the residual error weight detection units 60 described in the first embodiment are represented as an mth degree function having the average value of the absolute value of the error signal as its variable; next, an embodiment that reduces the performance degradation due to the channel estimation error by forcing the residual error weight to zero will be described.

As shown in FIG. 1, the reception device 2 according to the second embodiment includes signal receiving units 10, a known signal generating unit 20, signal processing units 230-1, . . . , 230-N (referred to as signal processing units 230 when there is no particular need to distinguish among them individually), a combining ratio calculation unit 70, a diversity combining unit 80, and an inverse Fourier transform unit 90. The reception device 2 according to the second embodiment differs from the reception device 1 according to the first embodiment in regard to the signal processing units 230.

The signal processing units 230 include Fourier transform units 40, channel estimation units 50, and residual error weight detection units 260-1, . . . , 260-N (referred to as residual error weight detection units 260 when there is no particular need to distinguish among them individually). The signal processing units 230 in the second embodiment differ from the signal processing units 30 in the first embodiment in regard to the residual error weight detection units 260.

Figure 6:
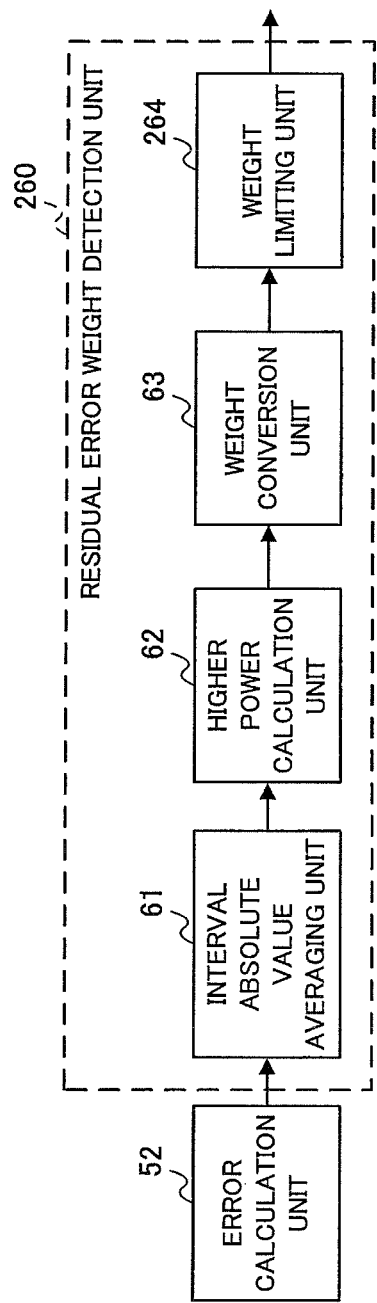
FIG. 6 is a block diagram schematically showing the structure of the residual error weight detection unit in the second embodiment.

FIG. 6 is a block diagram schematically showing the structure of a residual error weight detection unit 260. The residual error weight detection unit 260 includes an interval absolute value averaging unit 61, a higher power calculation unit 62, a weight conversion unit 63, and a weight limiting unit 264. The difference between the residual error weight detection unit 260 in the second embodiment and the residual error weight detection unit 60 in the first embodiment lies in the weight limiting unit 264. Also, in the second embodiment, the weight conversion unit 63 supplies the residual error weight signal it generates to the weight limiting unit 264.

When the residual error weight indicated by the residual error weight signal generated by the weight conversion unit 63 is less than a predetermined threshold value, the weight limiting unit 264 generates a corrected residual error weight by correcting the indicated residual error weight to zero. The weight limiting unit 264 generates a corrected residual error weight signal indicating the residual error weight or the corrected residual error weight, and supplies this corrected residual error weight signal to the combining ratio calculation unit 70.

The following exemplary expression (4) shows the relationship between the value raised to a higher power (G) indicated by the higher power value signal supplied from the higher power calculation unit 62 and the corrected residual error weight (K) generated by the weight limiting unit 264. The letters B and C denote positive real numbers.

[Mathematical expression 4]

$$\left.\begin{array}{l} K = 1 - BG,\ G < C < 1/B \\ K = 0,\ \text{other than the above} \end{array}\right\} \quad (4)$$

Figure 7:
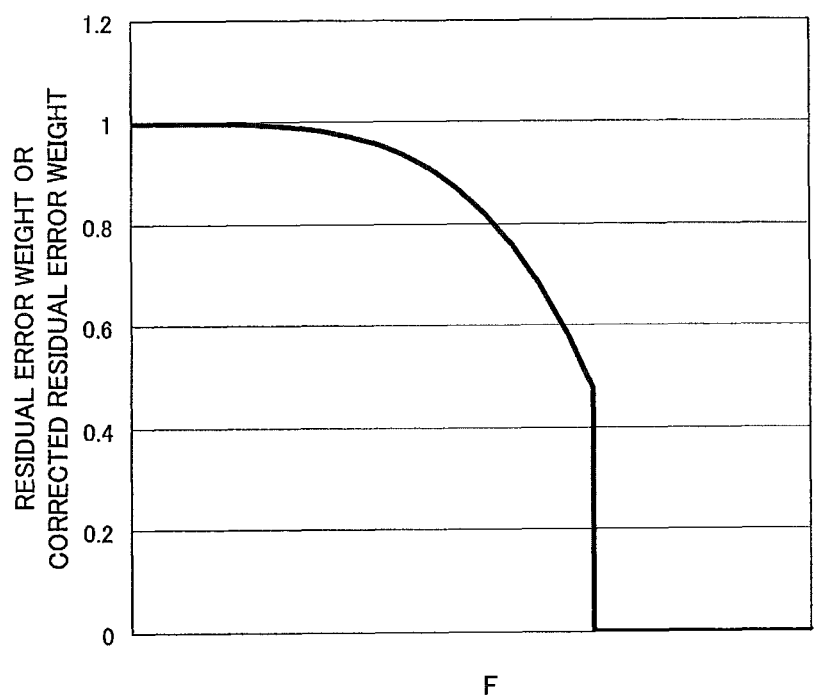
FIG. 7 is a schematic diagram showing a graph of a function with a horizontal axis indicating interval average value and a vertical axis indicating corrected residual error weight in the second embodiment.

FIG. 7 shows a graph of a function with the horizontal axis indicating the interval average value (F) supplied from the error calculation unit 52 and the vertical axis indicating residual error weight or corrected residual error weight. In FIG. 7, m=4.

The combining ratio calculation unit 70 uses the corrected residual error weight signal supplied from the weight limiting unit 264 to calculate the combining ratio.

As described above, because the second embodiment is configured so as to force the diversity combining ratio to zero when the channel estimation error is greater than a predetermined threshold value, the combining ratio when the channel estimation unit 50 cannot estimate the channel or when the identification filter coefficient calculation unit 53 diverges in the channel estimation process and a correct estimation result cannot be obtained can be held at zero, and reception performance degradation when the channel estimation error is large can be reduced.

Third Embodiment

In the first and second embodiments above, configurations that generate the residual error weight signal or the corrected residual error weight signal on the basis of the error signals calculated in the channel estimation process and calculate the combining ratios by use of the residual error weight or corrected residual error weight and the channel estimation results have been described; next, an embodiment that also calculates the combining ratio by use of the residual error weight signal or corrected residual error weight signal while channel estimation is not carried out will be described.

Figure 8:
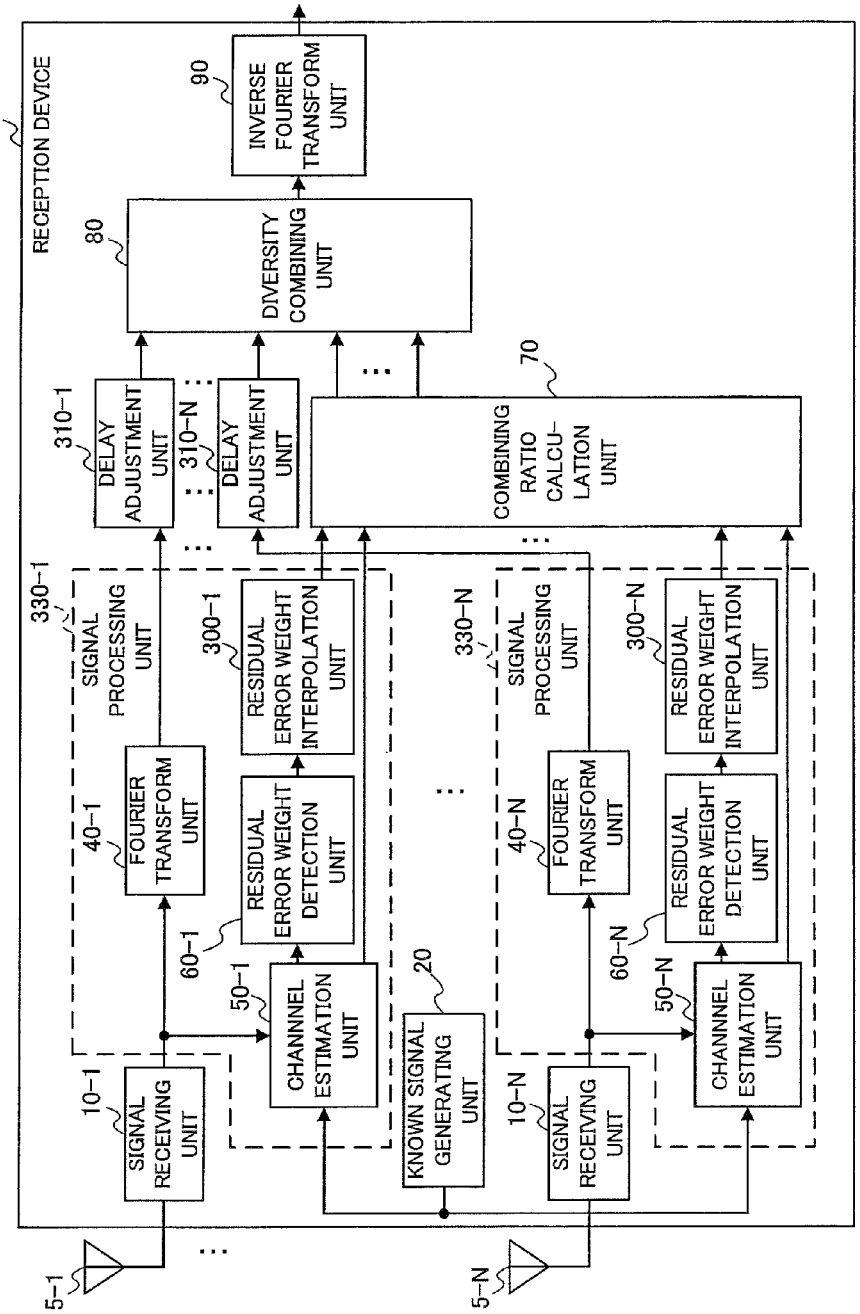
FIG. 8 is a block diagram schematically showing the structure of a reception device according to a third embodiment.

FIG. 8 is a block diagram schematically showing the structure of a reception device 3 according to the third embodiment. The reception device 3 according to the third embodiment includes signal receiving units 10, a known signal generating unit 20, signal processing units 330-1, . . . , 330-N (referred to as signal processing units 330 when there is no particular need to distinguish among them individually), a combining ratio calculation unit 70, a diversity combining unit 80, an inverse Fourier transform unit 90, and delay adjustment units 310-1, . . . , 310-N (referred to as delay adjustment units 310 when there is no particular need to distinguish among them individually). The reception device 3 according to the third embodiment differs from the reception device 1 according to the first embodiment in regard to the structure of the signal processing units 330 and also by including the delay adjustment units 310.

The signal processing units 330 include Fourier transform units 40, channel estimation units 50, residual error weight detection units 60, and residual error weight interpolation units 300-1, . . . , 300-N (referred to as residual error weight interpolation units 300 when there is no particular need to distinguish among them individually). The signal processing units 330 in the third embodiment differ from the signal processing units 30 in the first embodiment by including the residual error weight interpolation units 300. The residual error weight detection units 60 supply the residual error weight signals they generate to the residual error weight interpolation units 300. The reception device 3 includes the same numbers of residual error weight interpolation units 300 as the number of antennas 5, all operating identically.

Each residual error weight interpolation unit 300 calculates an interpolated residual error weight by performing interpolation in the time direction on the residual error weight indicated by the residual error weight signal supplied from the residual error weight detection unit 60. The residual error weight interpolation unit 300 supplies the combining ratio calculation unit 70 with the residual error weight signal supplied from the residual error weight detection unit 60, and the interpolated residual error weight signal indicating the calculated interpolated residual error weight.

When a known signal is embedded in a transmitted data sequence at regular intervals for use in channel identification, the residual error weight signal is detected at the known signal insertion spacing, so with the configurations in the first and second embodiments, residual error weight signals cannot be obtained during data intervals other than the known signal intervals.

By performing interpolation on the residual error weights indicated by the residual error weight signal supplied from the residual error weight detection unit 60, the residual error weight interpolation unit 300 generates an interpolated residual error weight signal during data intervals other than the known signal intervals, and outputs the generated interpolated residual error weight signal. The residual error weight interpolation unit 300 may generate interpolated residual error weights during the data intervals by performing, for example, linear interpolation from an obtained sequence of two residual error weights. Alternatively, as a method of interpolation other than linear interpolation, interpolated values may be calculated by a filtering process on the basis of, for example, a sequence of three or more residual error weights.

The combining ratio calculation unit 70 calculates the combining ratios on the basis of the residual error weight signals supplied from the residual error weight interpolation units 300 and the interpolated residual error weight signals. The combining ratio calculation method is the same as described in the first embodiment.

Each delay adjustment unit 310 delays the received frequency domain signal supplied from the corresponding Fourier transform unit 40, and supplies the delayed received frequency domain signal to the diversity combining unit 80. The delay time in this case is adjusted in such a way that the received frequency domain signal obtained from the Fourier transform unit 40 can be made to correspond to the combining ratio signal obtained from the combining ratio calculation unit 70 in the diversity combining unit 80.

As described above, according to the third embodiment, during a data interval, interpolated residual error weight signals are generated by performing interpolation on the residual error weight signals, and combining ratios can be calculated on the basis of the interpolated residual error weight signals, so even if there are temporal changes in the magnitudes of the residual error weights themselves, the diversity gain when the channels cannot be estimated frequently enough to cope with channel changes, when there are large temporal changes in channel characteristics and adequate processing time cannot be given to channel estimation, or when the channel characteristics change within the interval occupied by the reference signal used for channel estimation can be improved, and reception performance can be improved.

The third embodiment described above is configured as a variation of the configuration of the first embodiment, but it may be configured as a variation of the configuration of the second embodiment.

The present invention may be configured as a broadcast receiving device, a reproduction device, a recording and reproduction device, a communication apparatus, a mobile device, or an information processing device including the reception device 1, 2, or 3.

REFERENCE CHARACTERS 1, 2, 3: reception device, 10: signal receiving unit, 20: known signal generating unit, 30, 230, 330: signal processing unit, 40: Fourier transform unit, 50: channel estimation unit, 51: channel identification filter, 52: error calculation unit, 53: identification filter coefficient calculation unit, 54: identification filter coefficient Fourier transform unit, 60, 260: residual error weight detection unit, 61: interval absolute value averaging unit, 62: higher power calculation unit, 63: weight conversion unit, 264: weight limiting unit, 300: residual error weight interpolation unit, 70: combining ratio calculation unit, 71: computation unit, 72: complex conjugation unit, 73: power calculation unit, 74: power value weighting unit, 75: power summing unit, 76: branch combining ratio generating unit, 80: diversity combining unit, 90: inverse Fourier transform unit, 310: delay adjustment unit.

What is claimed is:

1. A reception device comprising:
a plurality of signal receiving units for generating a plurality of received signals from a plurality of signals obtained by receiving a transmitted signal at a plurality of antennas;
a plurality of signal processing units for performing processes of generating received frequency domain signals by transforming the received signals to signals in the frequency domain, calculating channel impulse responses of the received signals, calculating estimated received signals from the channel impulse responses, and calculating residual error weights with values that decrease with increasing differences between the received signals and the estimated received signals;
a combining ratio calculation unit for calculating combining ratios for the received frequency domain signals such that the ratios decrease as the residual error weights decrease;
a diversity combining unit for combining the received frequency domain signals according to the combining ratios to generate a diversity combined signal; and
an inverse transform unit for transforming the diversity combined signal to a time domain signal.

2. The reception device of claim 1, further comprising a known signal generating unit for generating a known signal added onto the transmitted signal, wherein the signal processing units include:
   transform units for generating received frequency domain signals by transforming the received signals to signals in the frequency domain;
   channel estimation units for calculating channel impulse responses of the received signals, adding the channel impulse responses to the known signal to generate the estimated received signals, and calculating differences between the received signals and the estimated received signals; and
   residual error weight detection units for calculating the residual error weights such that the residual error weights have values that decrease as the differences between the received signals and the estimated received signals increase.

3. The reception device of claim 2, wherein the channel estimation units include:
   channel identification filters for generating the estimated received signals by filtering the known signal responsive to filter coefficients;
   error calculation units for calculating the differences between the received signals and the estimated received signals;
   identification filter coefficient calculation units for updating the filter coefficients used by the channel identification filters so as to eliminate the differences and generating channel characteristic signals indicating the updated filter coefficients; and
   identification filter coefficient transform units for transforming the channel characteristic signals to frequency domain signals to generate frequency domain channel signals.

4. The reception device of claim 2, wherein the residual error weight detection units include:
   interval absolute value averaging units for calculating interval average values by averaging absolute values of the differences over prescribed intervals;
   higher power calculation units for calculating values raised to a higher power by taking the higher power of the interval average values; and
   weight conversion units for calculating the residual error weights in such a way that the residual error weights are non-negative and indicate values that decrease as the values raised to the higher power increase.

5. The reception device of claim 4, wherein the weight conversion units calculate products by multiplying the values raised to the higher power by a prescribed number, calculate complements by subtracting the products from 1, use the complements as the residual error weights when the complements are greater than 0, and use 0 as the residual error weights when the complements are equal to or less than 0.

6. The reception device of claim 5, wherein the residual error weight detection units further include weight limiting units that correct the residual error weights to 0 when the residual error weights are less than a predetermined threshold value.

7. The reception device of claim 3, wherein the combining ratio calculation unit includes:
   a plurality of complex conjugation units for generating complex conjugate signals of the frequency domain channel signals;
   a plurality of power calculation units for calculating squared values of amplitudes of the frequency domain channel signals;
   a plurality of power value weighting units for generating weighted power values by weighting the squared values with the residual error weights;
   a power summing unit for calculating a total sum of the weighted power values generated by the plurality of power value weighting units; and
   a plurality of branch combining ratio generating units for calculating the combining ratios from proportions of the values of the complex conjugate signals weighted by the residual error weights in the total sum.

8. The reception device of claim 2, wherein the signal processing units further include residual error weight interpolation units for calculating interpolated residual error weights by performing interpolation on the residual error weights, and the combining ratio calculation unit also calculates the combining ratios in such a way that the combining ratios decrease as the interpolated residual error weights decrease.

9. A reception method comprising:
   a signal receiving step for generating a plurality of received signals from a plurality of signals obtained by receiving a transmitted signal at a plurality of antennas;
   a signal processing step for performing processes of generating received frequency domain signals by transforming the received signals to signals in the frequency domain, calculating channel impulse responses of the received signals, calculating estimated received signals from the channel impulse responses, and calculating residual error weights with values that decrease with increasing differences between the received signals and the estimated received signals;
   a combining ratio calculation step for calculating combining ratios for the received frequency domain signals such that the ratios decrease as the residual error weights decrease;
   a diversity combining step for combining the received frequency domain signals according to the combining ratios to generate a diversity combined signal; and
   an inverse transform step for transforming the diversity combined signal to a time domain signal.

10. The reception method of claim 9, further comprising a known signal generating step for generating a known signal added onto the transmitted signal, wherein the signal processing step includes:
   a transform step for generating received frequency domain signals by transforming the received signals to signals in the frequency domain;
   a channel estimation step for calculating channel impulse responses of the received signals, adding the channel impulse responses to the known signal to generate the estimated received signals, and calculating differences between the received signals and the estimated received signals; and
   a residual error weight detection step for calculating the residual error weights such that the residual error weights have values that decrease as the differences between the received signals and the estimated received signals increase.

11. The reception method of claim 10, wherein the channel estimation step includes:
   a channel identification filtering step for generating the estimated received signals by filtering the known signal responsive to filter coefficients;
   an error calculation step for calculating the differences between the received signals and the estimated received signals;

an identification filter coefficient calculation step for updating the filter coefficients used in the channel identification filtering step so as to eliminate the differences and generating channel characteristic signals indicating the updated filter coefficients; and an identification filter coefficient transform step for transforming the channel characteristic signals to frequency domain signals to generate frequency domain channel signals.

12. The reception method of claim 10, wherein the residual error weight detection step includes:

an interval absolute value averaging step for calculating interval average values by averaging absolute values of the differences over prescribed intervals;

a higher power calculation step for calculating values raised to a higher power by taking the higher power of the interval average values; and a weight conversion step for calculating the residual error weights in such a way that the residual error weights are non-negative and indicate values that decrease as the values raised to the higher power increase.

13. The reception method of claim 12, wherein the weight conversion step calculates products by multiplying the values raised to the higher power by a prescribed number, calculates complements by subtracting the products from 1, uses the complements as the residual error weights when the complements are greater than 0, and uses 0 as the residual error weights when the complements are equal to or less than 0.

14. The reception method of claim 13, wherein the residual error weight detection step further includes a weight limiting step that corrects the residual error weights to 0 when the residual error weights are less than a predetermined threshold value.

15. The reception method of claim 11, wherein the combining ratio calculation step includes:

a plurality of complex conjugation steps for generating complex conjugate signals of the frequency domain channel signals;

a plurality of power calculation steps for calculating squared values of amplitudes of the frequency domain channel signals;

a power value weighting step for generating weighted power values by weighting the squared values with the residual error weights;

a power summing step for calculating a total sum of the weighted power values; and a branch combining ratio generating step for calculating the combining ratios from proportions of the values of the complex conjugate signals weighted by the residual error weights in the total sum.

16. The reception method of claim 10, wherein the signal processing step further includes a residual error weight interpolation step for calculating interpolated residual error weights by performing interpolation on the residual error weights, and the combining ratio calculation step also calculates the combining ratios in such a way that the combining ratios decrease as the interpolated residual error weights decrease.

* * * * *